United States Patent [19]

Newlin

[11] 4,149,820

[45] Apr. 17, 1979

[54] PIPE TAPPING RATCHET ASSEMBLY

[76] Inventor: Wayne A. Newlin, R.R. #1, Box 374, Plainfield, Ind. 46168

[21] Appl. No.: 861,526

[22] Filed: Dec. 19, 1977

[51] Int. Cl.² .................. B23B 45/12; B25B 13/46
[52] U.S. Cl. .................. 408/120; 408/123; 81/60; 81/185
[58] Field of Search .......... 408/120, 123, 238, 239 R, 408/239 A, 240, 215, 121, 122, 122.5; 81/58, 60, 185; 279/1 A

[56] References Cited

U.S. PATENT DOCUMENTS

| 213,916 | 4/1879 | Martin | 408/120 |
|---|---|---|---|
| 2,985,899 | 5/1961 | Elliott | 408/222 |
| 3,364,510 | 1/1968 | Johnson | 408/123 |

Primary Examiner—Leonidas Vlachos
Attorney, Agent, or Firm—Woodard, Weikart, Emhardt & Naughton

[57] ABSTRACT

A pipe tapping ratchet assembly is disclosed herein which comprises a ratchet handle and a socket attachment received thereon. The socket attachment defines an aperture within which an adapter is received, the aperture and the adapter being configured to prevent relative rotation therebetween. A tap is received within holes defined by the adapter. The holes in the adapter are conveniently configured to receive presently available taps, while preventing relative rotation between the taps and the adapter.

10 Claims, 3 Drawing Figures

PIPE TAPPING RATCHET ASSEMBLY

BACKGROUND OF THE INVENTION

1. Field of the Invention

The present invention relates to a ratchet assembly useful for tapping pipes and similar articles, and more particularly to a pipe tapping ratchet assembly which employs an adapter for permitting the use of presently available taps in conjunction with typical ratchet wrench devices.

2. Description of the Prior Art

Ratchet devices of various structures and uses have been well known in the art for many years. Ratchet devices are recognized as being particularly convenient for driving a member in rotation with only a limited and repeated rotative movement of a handle member. Ratchet devices are typically employed for driving such articles as screws, bolts, nuts and the like. More sophisticated ratchet assemblies may be used for drilling, tapping pipes, and similar operations. The present invention is directed at a ratchet assembly which is adapted for tapping pipes and similar articles, and which is simple and inexpensive in construction and operation.

In U.S. Pat. No. 2,268,089, issued to Wilson on Dec. 30, 1931, there is disclosed a pipe tapping tool which includes a ratchet device. The Wilson tool includes an elongated boring bar which from the cutting portion extends through a relatively complex apparatus to a ratchet mechanism. The ratch mechanism includes a square hole within which a squared end of the boring bar is received and which thereby prevents relative rotation of the boring bar with the ratchet mechanism. In contrast the typical ratchet wrench devices presently available, the Wilson tool includes a ratchet mechanism which is connected to the mounted boring bar by reception of the boring bar within an aperture defined by the ratchet mechanism. Typical ratchets presently available include a square post which is rotatable by the ratchet mechanism, with the post being used to secure various attachments to the ratchet mechanism for adapting the wrench to various applications. The Wilson tool employs a ratchet mechanism and boring bar which are specifically designed for use with one another, whereas the present invention provides an assembly which includes an adapter for permitting the use of typical ratchet wrench devices presently available in conjunction with typical pipe taps.

A ratchet wrench is disclosed in U.S. Pat. No. 1,724,491, issued to Mandl on Aug. 13, 1929. The Mandl patent does disclose a ratchet device which may include various attachments receivable upon a post which is driven in rotation by the ratchet wrench. These various attachments are designed for adapting the Mandl wrench for use in driving various sizes of bolts and the like, but are not designed at adapting the wrench for use as a pipe tap. Other ratchet mechanisms are disclosed in U.S. Pat. Nos. 2,766,648, issued to Jazwieck on Oct. 16, 1956; 2,697,370, issued to Brooks on Dec. 21, 1954; 2,647,420, issued to Stallings on Aug. 4, 1953; and 1,347,691, issued to Forton on July 27, 1920. Each of these patents are directed at the disclosure of various constructions of the ratchet mechanisms used in wrenchs and other tools. In none of these patents, however, it there disclosed an assembly adapted for tapping pipes and which employs conventional ratchet wrenches and pipe taps in combination.

SUMMARY OF THE INVENTION

In a preferred embodiment, the present invention comprises a pipe tapping ratchet assembly including a ratchet handle having a post which is rotatable about an axis by a ratchet mechanism, a socket attachment received upon the post and defining an aperture, an adapter received within the aperture of the socket attachment, the adapter including an aperture extending from one end, and a tap received within the aperture defined by the adapter, the post, socket attachment adapter and tap are configured to prevent relative rotation therebetween.

Is an object of the present invention to provide a pipe tapping ratchet assembly which employs an adapter for permitting the use of presently available ratchet wrenches in conjunction with pipe taps.

Another object of the present invention is to provide a pipe tapping ratchet assembly which is simple and inexpensive in construction an operation.

It is a further object of the present invention to provide a piped tapping ratchet assembly which includes an extension arm to facilitate handling and use of the assembly.

Further objects an advantages of the present invention will become apparent from the description of the preferred embodiment which follows.

DESCRIPTION OF THE PREFERRED EMBODIMENT

Figure 1:
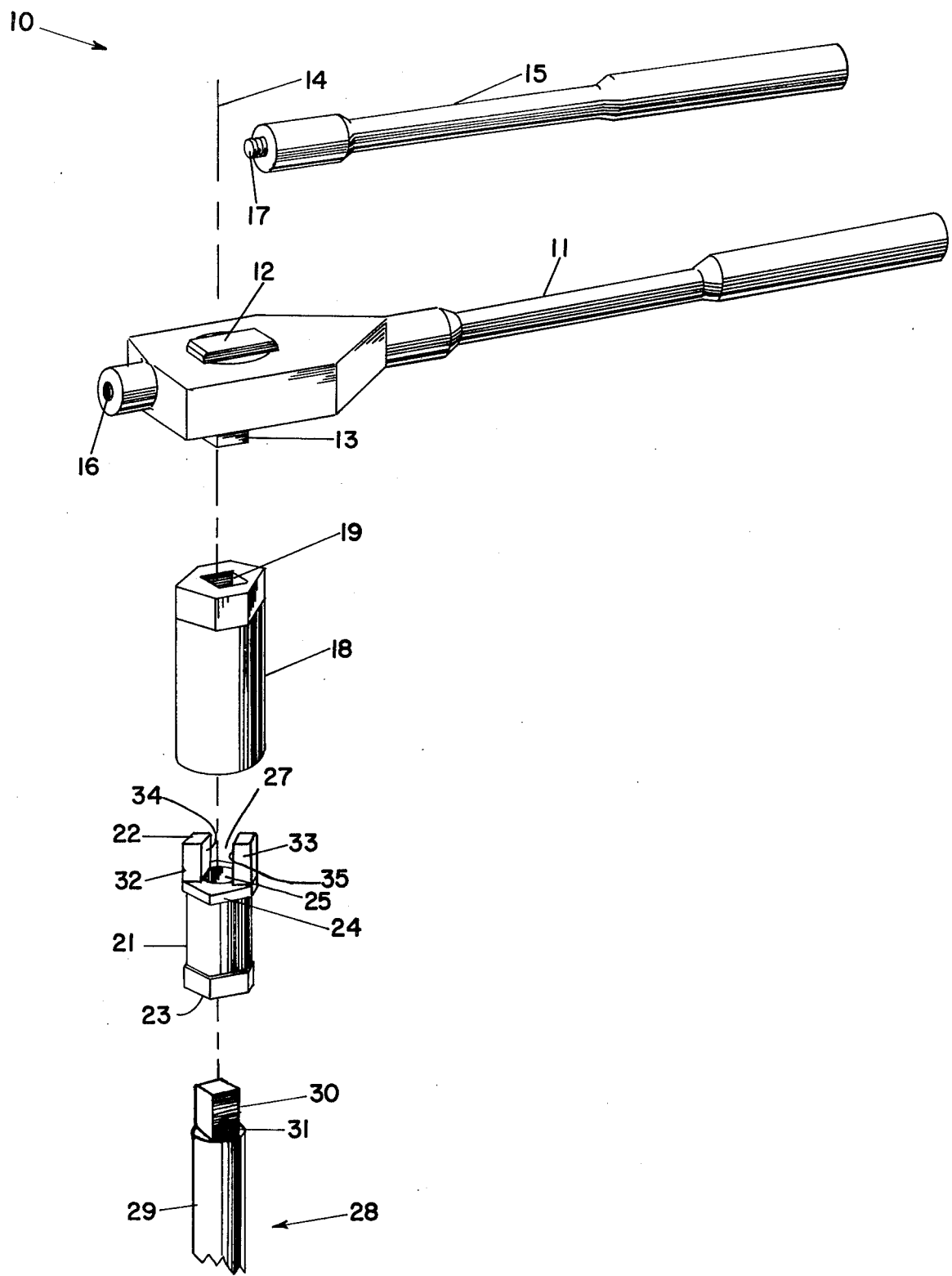
FIG. 1 is an exploded, perspective view of the preferred embodiment of the pipe tapping ratchet assembly of the present invention.

Referring particularly to the drawings, there is shown in FIG. 1 a pipe tapping ratchet assembly 10 constructed in accordance with the present invention. Assembly 10 includes a ratchet handle 11 within which is contained a ratchet mechanism 12 as is known in the art. Ratchet mechanism 12 includes a post 13 which is operable by the ratchet mechanism to be rotated about an axis 14. Ratchet handle 11 includes a threaded aperture 16 within which a screw portion 17 on an extension arm 15 is received.

A socket attachment 18, such as that commonly known in the art for use with hexagonal nuts or bolts, includes a square aperture 19 within which the post 13 is received. Socket attachment 18 further includes a multi-sided opening 20 (FIG. 2) within which an adapter 21 is received. Adapter 21 includes a first end 22 and a second end 23. The exterior 24 of the first end 22 of adapter 21 is complementary in shape with the opening 20 of socket attachment 18 to prevent relative rotation of the adapter and the socket attachment about the rotational axis 14. Typically, the exterior 24 may be hexagonal in cross section to be readily receivable within common socket attachments presently in use.

Figure 2:
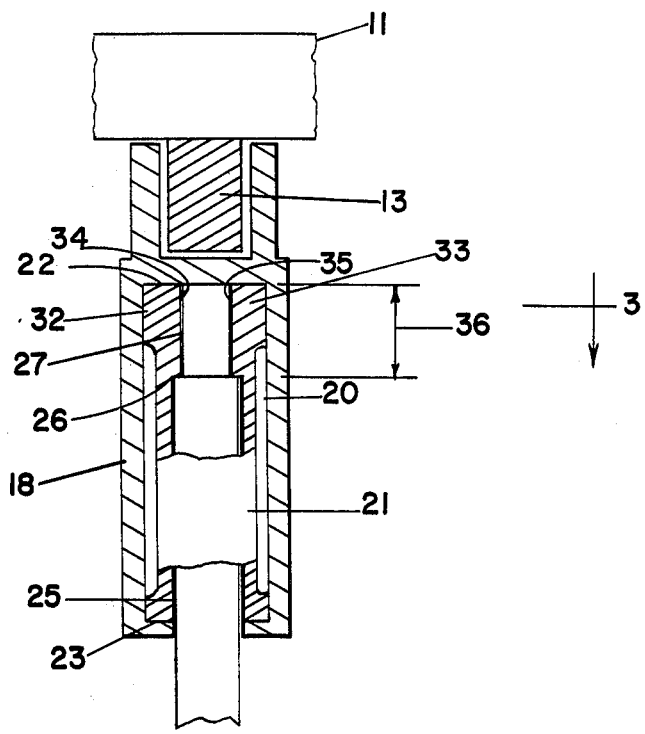
FIG. 2 is a partial, cross-sectional side view of the embodiment of FIG. 1.
Figure 3:
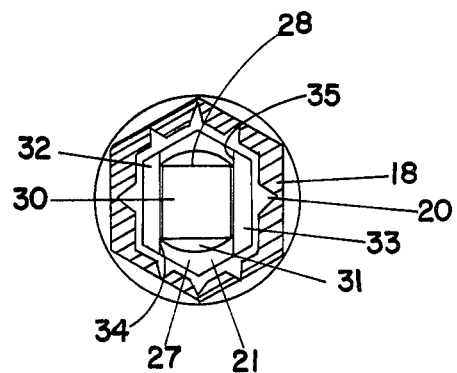
FIG. 3 is a partial, cross-sectional top view of the embodiment of FIG. 1, taken along the line 3 in FIG. 2 in the direction of the arrow.

Adapter 21 includes a first hole 25 terminating at a shoulder 26 (FIG. 2). Adapter 21 further includes a second hole 27. Adapter 21 thereby receives a tap 28 which includes a first portion 29 received within the first hole 25 and a second portion 30 received within the second hole 27. Typical taps include a cylindrical first portion 29 and a square second portion 30. These portions are received respectively within the cylindrical hole 25 of adapter 21 and the hole 27 which is bounded on two sides by arms 32 and 33. First portion 29 of tap 28 terminates in a shoulder 31 which engages shoulder 26 of adapter 21.

Arms 32 and 33 of adapter 21 include flat, interior surfaces 34 and 35, respectively. Square portion 30 of tap 28 is received between mutually-facing surfaces 34 and 35 and tap 28 and adapter 21 are thereby prevented from relative rotation about axis 14. Preferably, the length 36 of square portion 30 is equivalent to the length along axis 14 of hole 27. This results in the end of square portion 30, and therefore of tap 28, being coplanar with the end 22 of adapter 21 when the shoulder 31 of the tap is resting against the shoulder 26 of the adapter.

The present invention provides a pipe tapping ratchet assembly which is readily constructed and easily used. In operation, the socket attachment 18 is mounted upon the rotatable post 13 of ratchet handle 11. Adapter 21 is received within socket attachment 18 and exterior 24 of the adapter 21 prevents relative rotation between the adapter and socket attachment. The tap 28 is received within adapter 21 and the cooperation of the square portion 30 of the tap and the flat surfaces 34 and 35 of the adapter prevent relative rotation between the two about the rotational axis 14. The invention thereby provides an assembly which provides a ratchet assembly useful in the tapping of pipes of similar purposes. Moreover, an extension arm 13 may be threaded on to the ratchet handle 11 to facilitate the use of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A pipe tapping ratchet assembly which comprises:
    a ratchet handle including a ratchet mechanism and a post, the post being rotatable about a rotational axis by the ratchet mechanism;
    a socket attachment adapted to be received upon said ratchet handle, said socket attachment defining a first aperture within which the post of said ratchet handle is received, the post and the first aperture being of complementary shapes which prevent relative rotation of the post and said socket attachment about the rotational axis, said socket attachment further defining a second aperture;
    an adapter having first and second ends, the first end of said adapter being receivable within the second aperture of said socket attachment, said adapter having an exterior shape at its first end, the exterior shape at the first end of said adapter and the second aperture of said socket attachment being of complementary shapes which prevent relative rotation of said adapter and said socket attachment about the rotational axis, said adapter defining a first hole extending axially from the second end of said adapter to a location spaced apart from the first end of said adapter, said adapter defining a second hole communicating with and extending axially from the first hole in the direction of the first end of said adapter, the second hole having a minimum diametric measurement less than the minimum diametric measurement of the first hole; and
    a tap having first and second portions, the first portion being received within the first hole of said adapter, the second portion being received within the second hole of said adapter, the second portion having an exterior shape, the exterior shape of the second portion and the second hole of said adapter being of complementary shapes to prevent relative rotation of said tap and said adapter about the rotational axis.

2. The apparatus of claim 1 in which the first hole of said adapter is cylindrical and the first portion of said tap is cylindrical.

3. The apparatus of claim 1 and further comprising an extension arm attached to said ratchet handle and means for attaching said extension arm to said ratchet handle.

4. The apparatus of claim 1 in which the second hole extends to the first end of said adapter.

5. The apparatus of claim 1 in which the portion of said adapter adjacent the first end of said adapter is bifurcated, the second hole extending from the first hole to the second end of said adapter.

6. The apparatus of claim 5 in which the bifurcated portion includes first and second arms, the first and second arms including flat, mutually-facing surfaces.

7. The apparatus of claim 5 in which the first hole of said adapter is cylindrical and the first portion of said tap is cylindrical, the perpendicular distance between the flat, mutually-facing surfaces being less than the diameter of the first, cylindrical hole.

8. The apparatus of claim 7 in which the second hole extends to the first end of said adapter.

9. The apparatus of claim 8 in which the axial length of the second hole of said adapter is approximately equal to the axial length of the second portion of said tap.

10. The apparatus of claim 9 and further comprising an extension arm attached to said ratchet handle and means for attaching said extension arm to said ratchet handle.

* * * * *